US007237968B2

(12) United States Patent
Sawai

(10) Patent No.: US 7,237,968 B2
(45) Date of Patent: Jul. 3, 2007

(54) THERMALLY TRANSCRIBING PRINTER AND IMAGE FORMING APPARATUS

(75) Inventor: Kunio Sawai, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 298 days.

(21) Appl. No.: 11/019,214

(22) Filed: Dec. 23, 2004

(65) Prior Publication Data

US 2005/0141948 A1 Jun. 30, 2005

(30) Foreign Application Priority Data

Dec. 25, 2003 (JP) .......................... P2003-430867

(51) Int. Cl.
*B41J 2/32* (2006.01)
*F16H 57/00* (2006.01)
*B41J 13/076* (2006.01)

(52) U.S. Cl. .......................... 400/641; 74/431; 74/405

(58) Field of Classification Search ..................... None
See application file for complete search history.

(56) References Cited

U.S. PATENT DOCUMENTS 1,648,200 A * 11/1927 Schulze ...................... 403/333
2,179,994 A * 11/1939 Ebert et al. .............. 403/379.5
3,830,577 A * 8/1974 Rampe et al. .............. 403/378
4,952,093 A * 8/1990 Murakami .................. 403/261
4,971,467 A * 11/1990 Kamei et al. ............... 400/611
5,172,989 A * 12/1992 Imaseki et al. ............. 400/641

FOREIGN PATENT DOCUMENTS

JP 62108624 U * 7/1987
JP 08101552 A * 4/1996
JP 2003148503 A * 5/2003
JP 2005350226 A * 12/2005

* cited by examiner

*Primary Examiner*—Daniel J. Colilla
(74) *Attorney, Agent, or Firm*—Crowell & Moring LLP

(57) ABSTRACT

In a thermally transcribing printer including a frame, a roller shaft, a roller shaft drive gear and a motor, the roller shaft includes one end installed on an inner side of the frame and folded to bend in an L-like shape and other end fitted to a drawout preventing portion in a recess shape of the frame. The roller shaft drive gear includes a hook portion attached to the one end of the roller shaft, engaged with a portion of the roller shaft other than the fold-bend portion disposed a vicinity of the one end of the roller shaft and having an opening width smaller than a diameter of the roller shaft for restraining the roller shaft from being detached in the bended direction, and a pair of rotation preventing ribs for holding to squeeze the fold-bend portion of the roller shaft.

5 Claims, 7 Drawing Sheets

THERMALLY TRANSCRIBING PRINTER AND IMAGE FORMING APPARATUS

BACKGROUND OF THE INVENTION

1. Field of the Invention

The present invention relates to a thermally transcribing printer and an image forming apparatus, particularly relates to a thermally transcribing printer and an image forming apparatus provided with a roller shaft attached with a roller used at least for one of sheet charging and sheet discharging and a roller shaft drive gear.

2. Description of the Related Art

In a background art, there is known an image forming apparatus (recording apparatus) of a thermally transcribing printer or the like including a roller shaft attached with a roller used at least for one of sheet charging and sheet discharging and a roller shaft drive gear (refer to, for example, JP-UM-A-62-108624).

JP-UM-A-62-108624, mentioned above, discloses a recording apparatus in which at a portion of fitting a roller shaft attached with a platen (roller) for carrying sheet and a roller shaft drive gear, a pin inserting hole orthogonal to an axial direction is provided at the roller shaft, a pin is attached to the pin inserting hole, the pin is fitted with a groove both ends in a longitudinal direction of which are closed provided at a side face of the gear to thereby fix the roller shaft and a drive force transmitting portion of the roller shaft drive gear.

FIG. 11 is a perspective view showing a total constitution of a thermally transcribing printer according to an example of a background art. FIG. 12 is a sectional view showing a structure of attaching a roller shaft of the background art shown in FIG. 11. FIG. 13 is a perspective view showing a structure of attaching the roller shaft shown in FIG. 12 to a roller shaft drive gear. An explanation will be given of a structure of the thermally transcribing printer according to the example of the background art in reference to FIG. 11 through FIG. 13.

A shown by FIG. 11, a thermally transcribing printer apparatus of the background art includes a frame 101 made of a metal, a roller shaft 102 for charging sheet and discharging sheet, a roller shaft drive gear 103 made of a resin, a motor 104, a feeding roller 105, a motor bracket 106 made of a metal, a sheet bottom receiving guide 107, an ink sheet case 108, a plurality of middle gears 109, an ink sheet winding gear 110, and bearing members 120 and 121. The frame 101 is formed in a channel-like shape including one side face 101*a* and other side face 101*b*. Further, as shown by FIG. 12 and FIG. 13, a feeding roller 105 comprising rubber is mounted to a predetermined region at an outer peripheral portion of the roller shaft 102. Further, one end 102*a* of the roller shaft 102 is rotatably inserted into the bearing member 121 and is fitted to the roller shaft drive gear 103. As shown by FIG. 13, the one end 102 of the roller shaft 102 is worked in a D cut shape and is fitted to a fitting hole 103*a* in a D-like shape of the roller shaft drive gear 103. Thereby, the roller shaft 102 and the roller shaft drive gear 103 can be connected without being idly rotated. The motor 104 is attached to the motor bracket 106 and functions as a drive source for driving the roller shaft drive gear 103 and the ink sheet winding gear 110.

Next, an explanation will be given of sheet charging and sheet discharging operation of the thermally transcribing printer according to the example of the background art. According to the sheet charging and sheet discharging operation of the printer of the background art, as shown by FIG. 11, a drive force of the motor 104 is transmitted to the roller shaft drive gear 103 and the ink sheet winding gear 110 via the plurality of middle gears 109. At this occasion, the drive force is transmitted from the roller shaft drive gear 103 to the roller shaft 102. Thereby, the roller shaft 102 is rotated while being supported by the bearing members 120 and 121 and therefore, the feeding roller 105 is rotated. As a result, sheet (not illustrated) is carried in a sheet charging direction or a sheet discharging direction. Further, the drive force is also transmitted from the ink sheet winding gear 110 to an ink sheet winding roller shaft (not illustrated) and therefore, an ink sheet (not illustrated) is wound.

According to the thermally transcribing printer of the background art shown in FIG. 11 through FIG. 13, the roller shaft 102 and the roller shaft drive gear 103 are connected so as not to be rotated idly and therefore, it is necessary to form the D cut shape at the one end 102*a* of the roller shaft 102 by machining requiring a time period in working. Therefore, there is a problem that part cost is expensive. Further, when the roller shaft 102 is integrated to the frame 101 having the channel-like shape in an integrating step, the roller shaft 102 is inserted into an inserting hole of the bearing member 121 from a lateral direction and therefore, integration operability is poor, as a result, there poses a problem that the integrating step is complicated.

Further, according to the structure disclosed in JP-UM-A-62-108624, mentioned above, it is necessary to provide the pin inserting hole in the direction orthogonal to the axial direction of the roller shaft and therefore, there poses a problem that a time period is taken in working to bore the roller shaft. Further, the pin is inserted into the roller shaft in an integrating step and therefore, there poses a problem that integration operability is poor.

SUMMARY OF THE INVENTION

The invention has been carried out in order to resolve the above-described problems and it is an object of the invention to provide a thermally transcribing printer and an image forming apparatus capable of reducing a time period of working a member for connecting a roller shaft and a roller shaft drive gear so as not to be rotated idly and capable of simplifying an integrating step.

According to a first aspect of the invention, there is provided a thermally transcribing printer which is a thermally transcribing printer including a frame made of a metal in a channel-like shape having one side face and other side face, a roller shaft made of a metal installed on an inner side of the frame and attached with a roller used for at least one of sheet charging and sheet discharging, a roller shaft drive gear made of a resin attached to one end of the roller shaft for rotating the roller shaft, a drive motor for driving to rotate the roller shaft drive gear, and a motor bracket made of a metal installed on an outer side of the one side face of the frame for attaching the motor, wherein the motor bracket includes a through hole rotatably fitted with the roller drive gear, the frame includes a drawout preventing portion in a recess shape provided at the other side face of the frame. The roller shaft made of the metal includes one end having a fold-bend portion bent in an L-like shape and other end fitted to the drawout preventing portion in the recess shape of the frame. Further, the roller shaft drive gear made of the resin is integrally formed with a hook portion engaged with a portion of the roller shaft other than the fold-bend portion disposed at a vicinity of the one end of the roller shaft and having an opening width smaller than a diameter of the roller shaft for restraining the roller shaft from being detached in a direction of extending the fold-bend portion, a pair of rotation preventing ribs for holding to squeeze the fold-bend portion of the roller shaft, an inserting portion rotatably inserted into the through hole of the motor bracket, and a stepped difference portion formed at a root portion of the inserting portion and brought into contact with a side face of the motor bracket.

According to the thermally transcribing printer of the first aspect of the inventions as described above, the roller shaft and the roller shaft drive gear can be connected so as not to be rotated idly without providing a D cut, a pin inserting hole or the like at the roller shaft, when the fold-bend portion in the L-like shape of the roller shaft is fitted to the hook portion and the rotation preventing rib of the roller shaft drive gear by providing the roller shaft made of the metal including the one end having the fold-bend portion bent in the L-like shape, and providing the hook portion engaged with the portion of the roller shaft other than the fold-bend portion disposed at the vicinity of the one end of the roller shaft for restraining the roller shaft from being detached in the direction of extending the fold-bend portion and the pair of rotation preventing ribs for holding to squeeze the fold-bend portion of the roller shaft at the roller shaft drive gear attached to the one end of the roller shaft. Thereby, the roller shaft and the roller shaft drive gear can be connected so as not to be rotated idly by only working to bend the roller shaft in the L-like shape which can be worked in a short period of time without forming a D cut, a pin inserting hole or the like requiring a time period for working the roller shaft. As a result, a time period of working the roller shaft can be reduced and therefore, working cost can be reduced. Further, in installing the roller-shaft and the roller shaft drive gear between side face portions arranged at a predetermined interval therebetween, the fold-bend portion in the L-like shape of the roller shaft can be fitted to the hook portion and the rotation preventing rib of the roller shaft drive gear from a vertical direction and therefore, in comparison with a case of attaching the roller shaft of the roller shaft drive gear from a horizontal direction, attachment of the roller shaft to the roller shaft drive gear is facilitated. Thereby, integrating steps can be simplified. Further, by providing the hook portion and the rotation preventing rib integrally with the roller shaft drive gear made of a resin, even when the hook portion and the rotation preventing rib are provided, a number of parts is not increased. Thereby, rotation of the roller shaft drive gear can be transmitted to the roller shaft without increasing the number of parts. Further, by providing the through hole rotatably fitted with the roller shaft drive gear at the motor bracket for attaching the motor, a member for attaching the roller shaft drive gear needs not to be provided separately and therefore, also thereby, the number of parts is not increased. Further, by providing the drawout preventing portion in the recess shape having the bottom portion fitted with the other end of the roller shaft, the roller shaft can be prevented from being drawn out in the horizontal direction. Further, by forming the inserting portion rotatably inserted into the through hole of the motor bracket and the stepped difference portion brought into contact with the side face of the motor bracket integrally with the roller shaft drive gear, when the position of the other end of the roller shaft is restricted in the state of bringing the stepped difference portion of the roller shaft drive gear into contact with the side face of the motor bracket, the positional shift of the roller shaft drive gear and the roller shaft in the horizontal direction can be restrained.

According to a second aspect of the invention, there is provided an image forming apparatus comprising a roller made of a metal attached with a roller used for at least either one of sheet charging and sheet discharging and including one end having a fold-bend portion bent in an L-like shape and a roller shaft drive gear attached to the one end of the roller shaft having the fold-bend portion for rotating the roller shaft, wherein the roller shaft drive gear includes a hook portion engaged with a portion of the roller shaft other than the fold-bend portion disposed at a vicinity of the one end of the roller shaft for restraining the roller shaft from being detached in a direction of extending the fold-bend portion, and a rotation preventing rib for holding the fold-bend portion of the roller shaft.

According to the printer apparatus of the second aspect of the invention, as described above, the roller shaft and the roller shaft drive gear can be connected so as not to be rotated idly without providing a D cut at the roller shaft when the fold-bend portion in the L-like shape of the roller shaft is fitted to the hook portion and the rotation preventing rib of the roller shaft drive gear by providing the roller shaft made of the metal including the one end having the fold-bend portion bent in the L-like shape, and providing the hook portion engaged with the portion of the roller shaft other than the fold-bend portion disposed at the vicinity of the one end for restraining the roller shaft from being detached in the direction of extending the fold-bend portion and the rotation preventing rib for holding to squeeze the fold-bend portion of the roller shaft at the roller shaft drive gear attached to the one end of the roller shaft. Thereby, the roller shaft and the roller shaft drive gear can be connected so as not to be rotated idly by only bending the roller shaft in the L-like shape which can be worked in a short period of time without forming a D cut, a pin inserting hole or the like requiring a time period in working the roller shaft. Thereby, a time period of working the roller shaft can be reduced and therefore, working cost can be reduced. Further, in installing the roller shaft and the roller shaft drive gear between side face portions arranged at a predetermined interval therebetween, the fold-bend portion in the L-like shape of the roller shaft can be fitted to the hook portion and the rotation preventing rib of the roller shaft drive gear from a vertical direction and therefore, in comparison with a case of attaching the roller shaft to the roller shaft drive gear from a horizontal direction, attachment of the roller shaft to the roller shaft drive gear is facilitated. Thereby, integrating steps can be simplified.

According to the image forming apparatus of the second aspect of the invention, preferably, the roller shaft drive gear is made of a resin and the hook portion and the rotation preventing rib are integrally formed with portions of the roller shaft drive gear made of the resin. When constituted in this way, a number of parts is not increased even when the roller shaft drive gear is provided with the hook portion and the rotation preventing rib. Thereby, rotation of the roller shaft drive gear can be transmitted to the roller shaft without increasing the number of parts.

Preferably, the image forming apparatus according to the second aspect of the invention further includes a drive motor for driving to rotate the roller shaft drive gear, a motor bracket attached with the drive motor and including a through hole rotatably fitted with the roller shaft drive gear, and a frame including a drawout preventing portion in a recess shape having a bottom portion fitted with other end of the roller shaft. When constituted in this way, the roller shaft can be prevented from being drawn out in the horizontal direction by the drawout preventing portion.

In the image forming apparatus including the drawout preventing portion, preferably, the roller shaft drive gear is integrally formed with an inserting portion rotatably inserted into the through hole of the motor bracket, and a stepped difference portion provided at a root portion of the inserting portion and brought into contact with a side face of the motor bracket. When constituted in this way, the positional shift of the roller shaft drive gear and the roller shaft in the horizontal direction can be restrained when the position of the other end of the roller shaft is restricted in the state of bringing the stepped difference portion of the roller shaft drive gear into contact with the side face of the motor bracket.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

An explanation will be given of an embodiment of the invention in reference to the drawings as follows.

Figure 1:
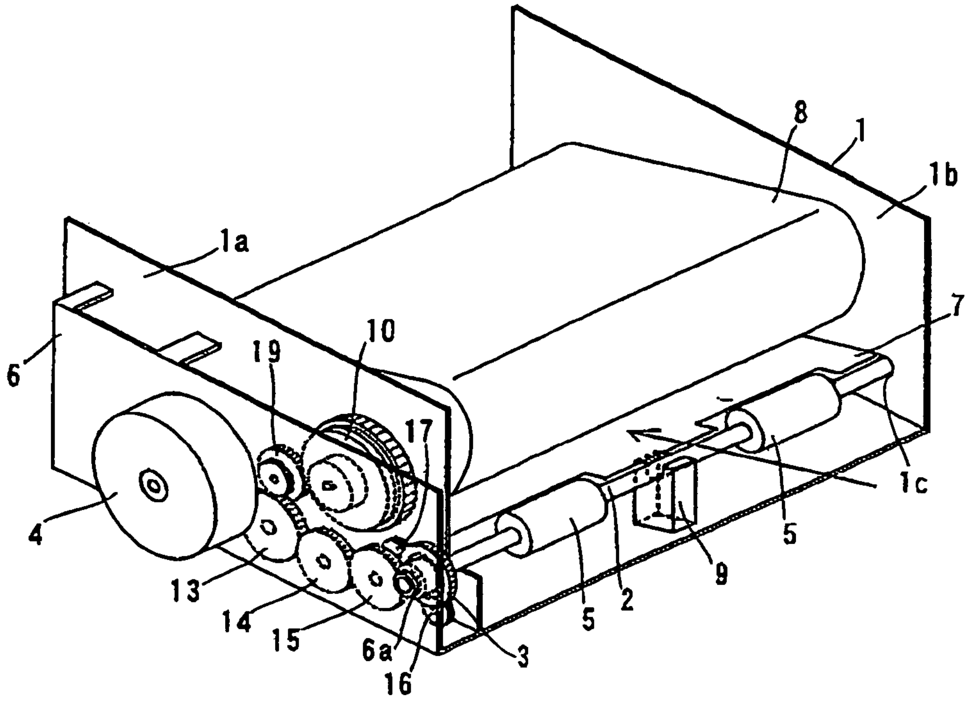
FIG. 1 is a perspective view showing a total constitution of a thermally transcribing printer according an embodiment of the invention.
Figure 2:
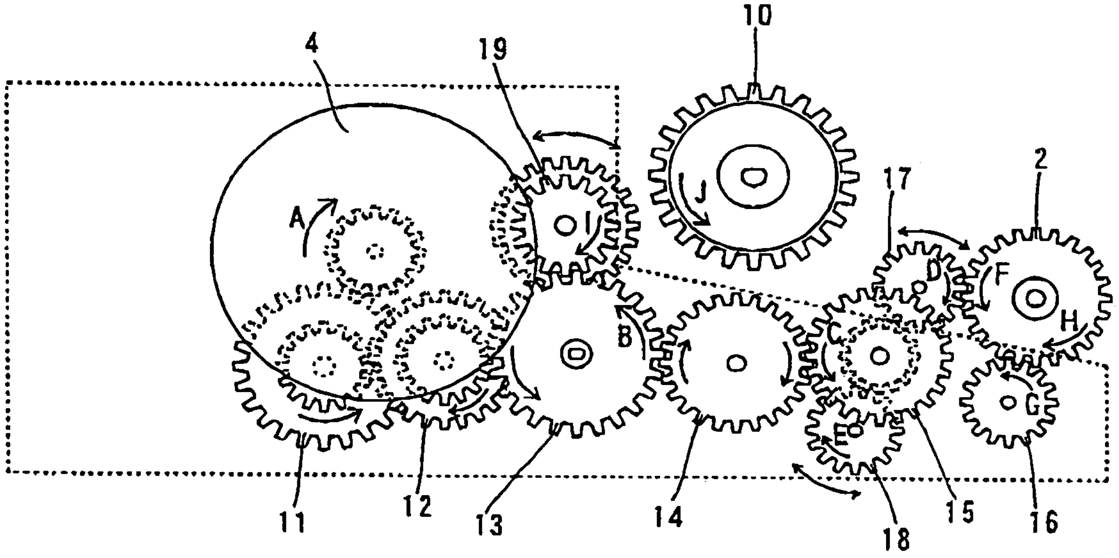
FIG. 2 is a front view showing a motor and respective gears of the thermally transcribing printer according to the embodiment shown in FIG. 1.
Figure 3:
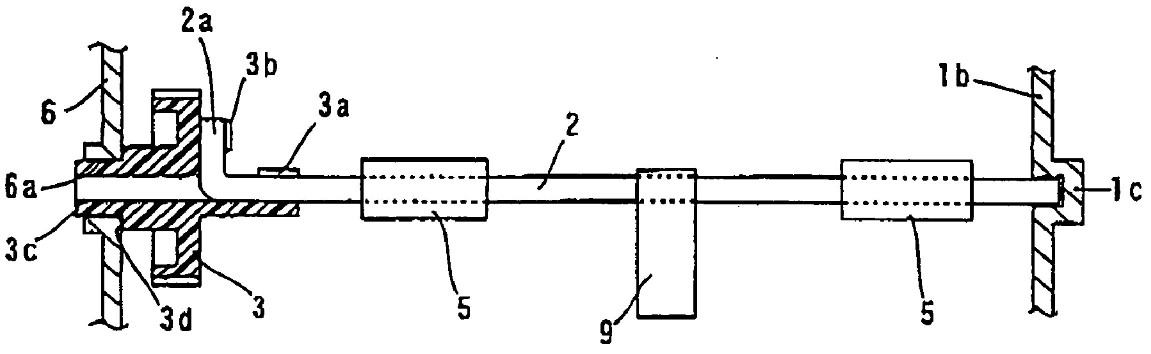
FIG. 3 is a sectional view showing a state of attaching a roller shaft and a roller shaft drive gear of the thermally transcribing printer according to the embodiment shown in FIG. 1.

FIG. 1 is a perspective view showing a total structure of a thermally transcribing printer according to an embodiment of the invention, FIG. 2 and FIG. 3 are views partially showing the structure of the thermally transcribing printer shown in FIG. 1. FIG. 4 through FIG. 7 are views showing structures of a roller shaft and a roller shaft drive gear of the thermally transcribing printer according to the embodiment of the invention shown in. FIG. 1. An explanation will be given of the structure of the thermally transcribing printer according to the embodiment of the invention.

As shown by FIG. 1 and FIG. 2, the thermally transcribing printer according to the embodiment of the invention includes a frame 1 made of a metal, a roller shaft 2 for charging and discharging sheet, a roller shaft drive gear 3 made of a resin, a motor 4, a feeding roller 5, a motor bracket 6 made of a metal, a sheet bottom receiving guide 7, an ink sheet case 8, a shaft supporting member 9, an ink sheet winding gear 10, and middle gears 11 through 19. Further, the thermally transcribing printer according to the embodiment is an example of an "image forming apparatus" of the invention.

The frame 1 is formed in a shape of a channel having one side face 1*a* and other side face 1*b*. As shown by FIG. 1 and FIG. 3, the frame 1 includes a drawout preventing portion 1*c* in a recess shape having a bottom portion fitted with other end of the roller shaft 2 at the other side face 1*b*.

Here, according to the embodiment, the roller shaft 2 is installed on an inner side of the frame 1 in the channel-like shape and includes one end including a fold-bend portion 2*a* bent in an L-like shape, and other end fitted to the drawout preventing portion 1*c* in the recess shape of the frame 1. The roller shaft 2 is mounted with the roller 5 comprising rubber.

Figure 4:
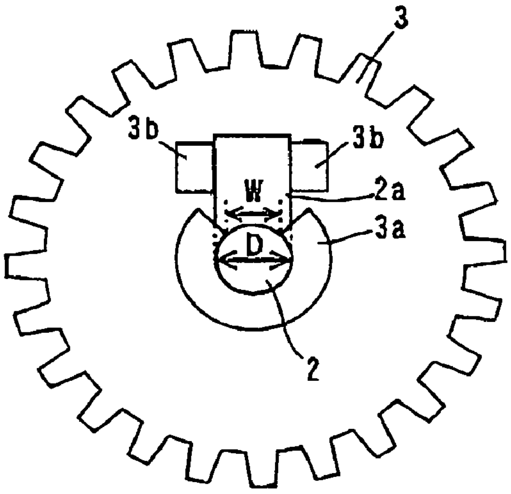
FIG. 4 is a front view showing a state of engaging the roller shaft and the roller shaft drive gear according to the embodiment shown in FIG. 3.
Figure 5:
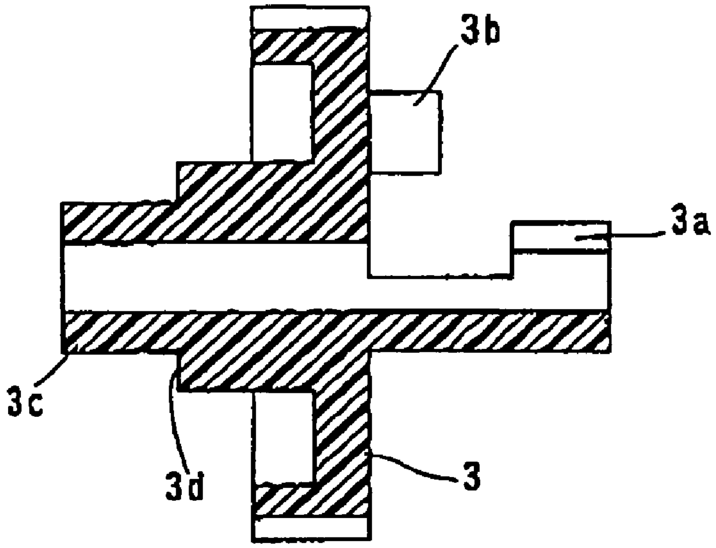
FIG. 5 is a side sectional view of the roller shaft drive gear according to the embodiment shown in FIG. 3.
Figure 6:
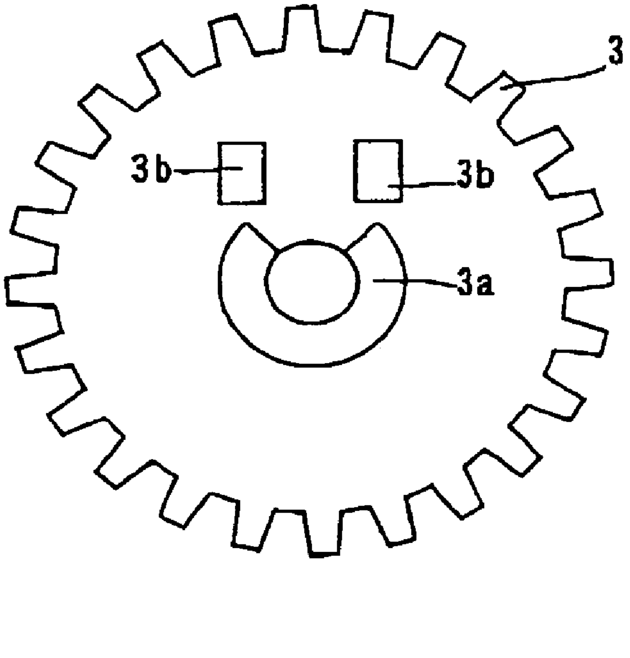
FIG. 6 is a front view of the roller shaft drive gear according to the embodiment shown in FIG. 5.
Figure 7:
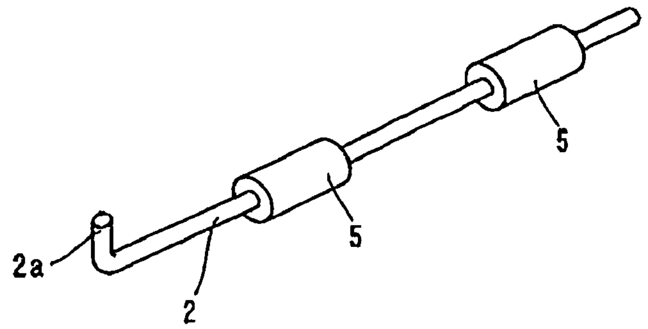
FIG. 7 is a perspective view of the roller shaft according to the embodiment shown in FIG. 3.

Further, according to the embodiment, as shown by FIG. 5 and FIG. 6, the roller shaft drive gear 3 is integrally provided with a hook portion 3*a*, a pair of rotation preventing ribs 3*b*, an inserting portion 3*c*, and a stepped difference portion 3*d*. The hook portion 3*a* is attached to one end of the roller shaft 2 and engaged with a portion other than the fold-bend portion 2*a* disposed at a vicinity of the one end of the roller shaft 2. The hook portion 3*a* is provided for restraining the roller shaft 2 from being detached in a direction of extending the fold-bend portion 2*a* and is provided with an opening width W smaller than a diameter D of the roller shaft 2 (refer to FIG. 4). Further, the pair of rotation preventing ribs 3*b* are arranged to fold to pinch the fold-bend portion 2*a* of the roller shaft 2. Further, the inserting portion 3*c* is rotatably inserted into a through hole of the motor bracket 6. Further, the stepped difference portion 3*d* is formed at a root portion of the inserting portion 3*c* and is formed to be brought into contact with a side face of the motor bracket.

Further, the motor 4 is attached to the motor bracket 6 attached to the one side face 1*a* of the frame 1. The motor 4 functions as a drive source for driving the roller shaft drive gear 3 and the ink sheet winding gear 10. Further, as shown by FIG. 2, the middle gears 11 through 19 are constituted by the middle gears 11 through 16 centers of the rotation of which are fixed and the pivotable middle gears 17 through 19. The pivotable middle gears 17 and 18 are engaged with the middle gear 15 and the pivotable middle gear 19 is engaged with the middle gear 13.

Figure 8:
FIG. 8 is a view for explaining an integrating step of the roller shaft and the roller shaft drive gear of the thermally transcribing printer according to the embodiment of the invention.
Figure 9:
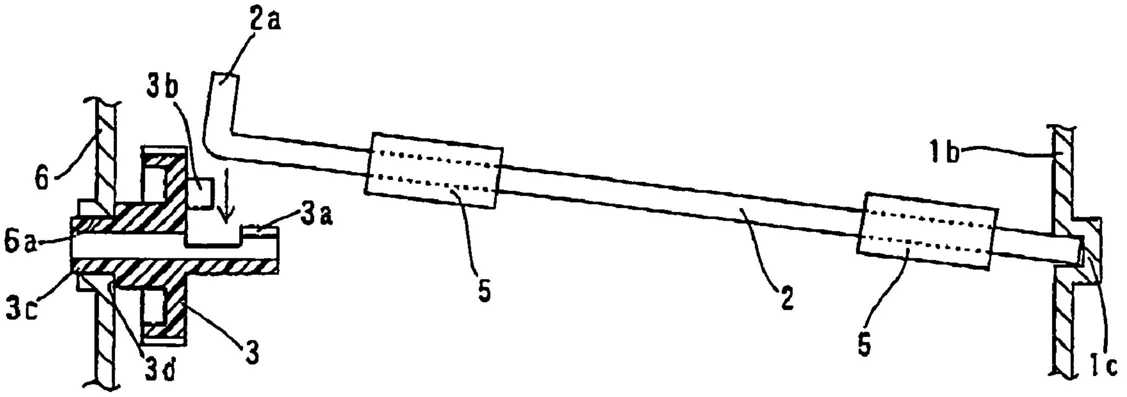
FIG. 9 is a view for explaining an integrating step of the roller shaft and the roller shaft drive gear of the thermally transcribing printer according to the embodiment of the invention.
Figure 10:
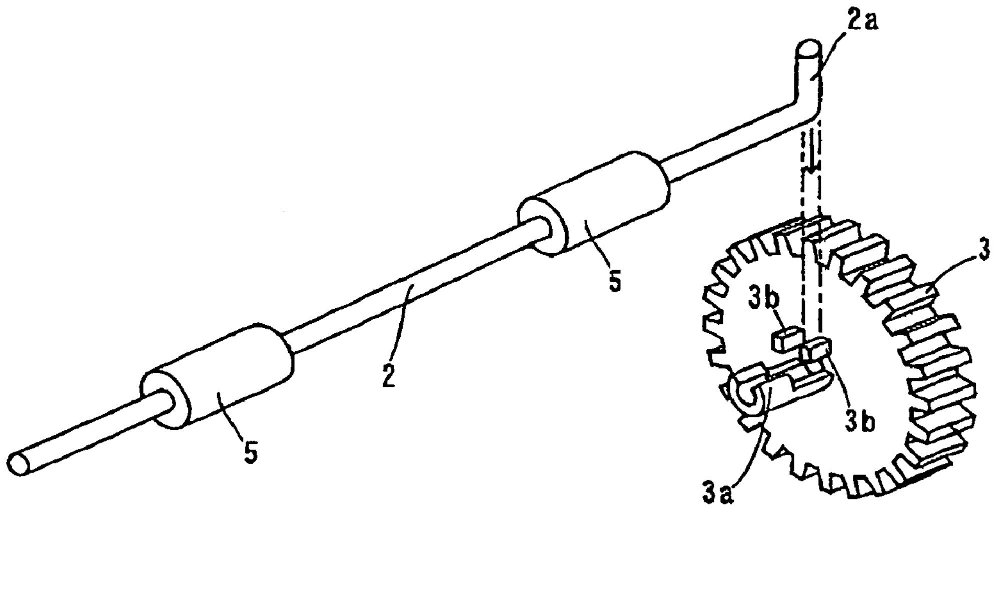
FIG. 10 is a view for explaining an integrating step of the roller shaft and the roller shaft drive gear of the thermally transcribing printer according to the embodiment of the invention.
Figure 11:
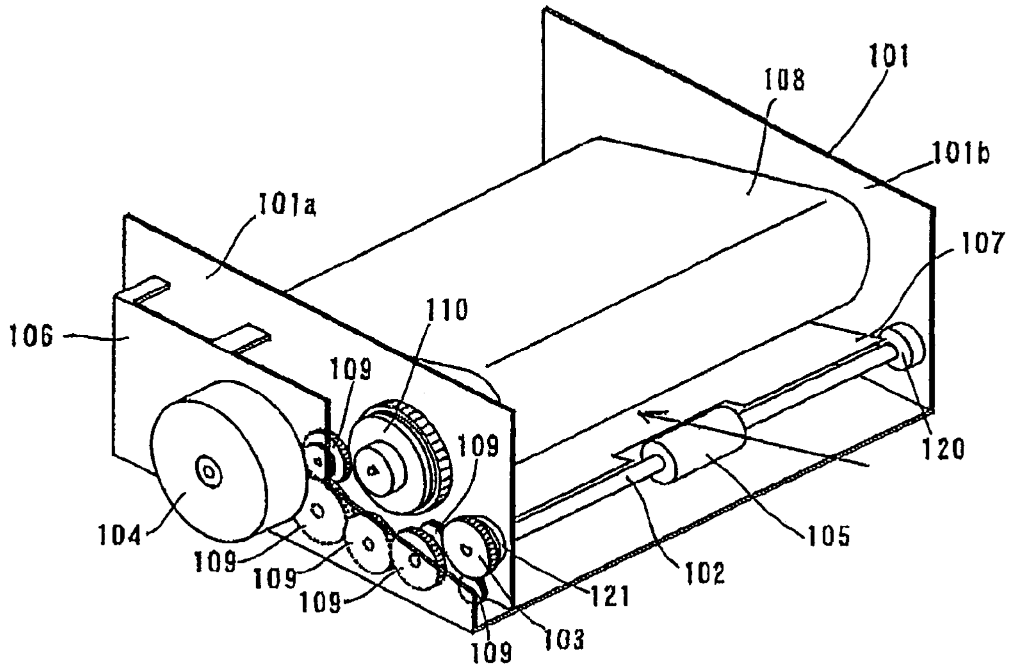
FIG. 11 PRIOR ART
FIG. 11 is a perspective view showing a total constitution of a thermally transcribing printer of a background art.
Figure 12:
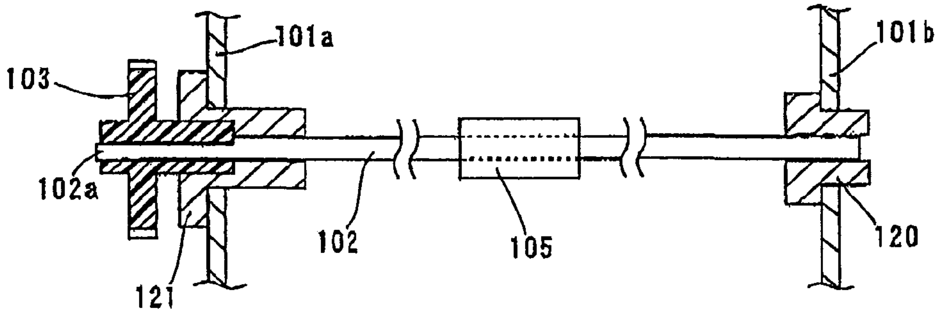
FIG. 12 PRIOR ART
FIG. 12 is a sectional view showing a structure of attaching a roller shaft of the background art shown in FIG. 11.
Figure 13:
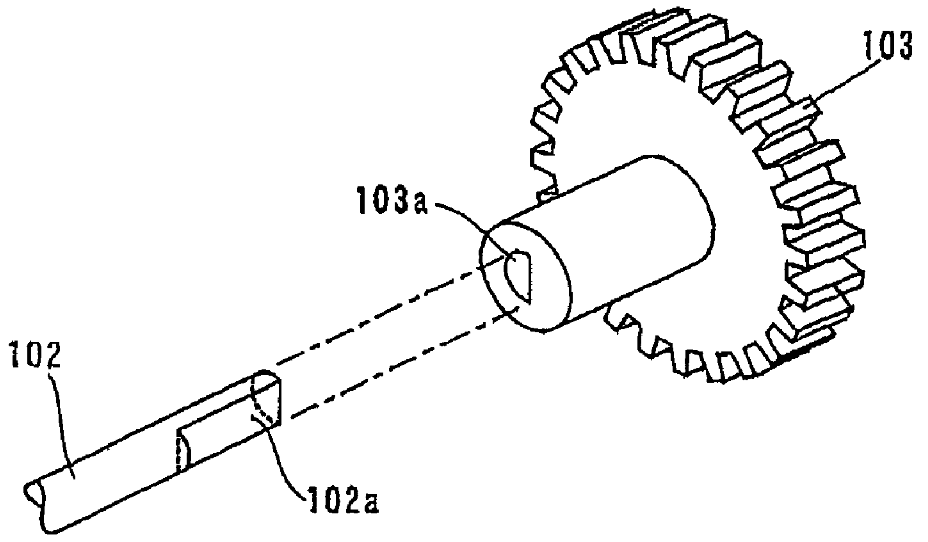
FIG. 13 PRIOR ART
FIG. 13 is a perspective view showing a structure of attaching the roller shaft shown in FIG. 12 to a roller shaft drive gear.

FIG. 8 through 10 are views for explaining integrating steps of the roller shaft and the roller shaft drive gear of the thermally transcribing printer according to the embodiment of the invention. Next, an explanation will be given of the integrating steps of the roller shaft 2 for charging and discharging sheet and the roller shaft drive gear 3 of the thermally transcribing printer according to the embodiment in reference to FIG. 3, FIG. 4 and FIG. 8 through FIG. 10. First, as shown by FIG. 8, the inserting portion 3*c* of the roller shaft drive gear 3 is inserted into a through hole 6*a* of the motor bracket 6. In this case, the inserting portion 3*c* is inserted into the through hole 6*a* of the motor bracket 6 until the stepped difference portion 3*d* of the roller shaft drive gear 3 is brought into contact with the side face of the motor bracket 6. Next, as shown by FIG. 9, the other end of the roller shaft 2 is fitted to the drawout preventing portion 1*c* in the recess shape provided at the outer side face lb. Thereafter, as shown by FIG. 9 and FIG. 10, the fold-bend portion 2*a* in the L-like shape of the roller shaft 2 is fitted to the hook portion 3*a* and the rotation preventing rib 3*b* of the roller shaft drive gear 3 from a vertical direction. Thereby, as shown by FIG. 3 and FIG. 4, the portion of the roller shaft 2 other than the fold-bend portion 2*a* in the L-like shape at the vicinity of the one end is engaged with the hook portion 3*a* and the fold-bend portion 2*a* in the L-like shape is brought into a state of being held between the pair of rotation preventing ribs 3*b*. In this way, the roller shaft 2 and the roller shaft drive gear 3 are integrated.

According to the embodiment, as described above, when the one end of the roller shaft 2 is fitted to the hook portion 3*a* and the rotation preventing ribs 3*b* of the roller shaft drive gear 3 by providing the fold-bend portion 2*a* bent in the L-like shape at the one end of the roller shaft 2, and providing the hook portion 3*a* engaged with the portion of the roller shaft 2 other than the fold-bend portion 2*a* disposed at the vicinity of the one end of the roller shaft 2 for restraining the roller shaft 2 from being detached in the direction of extending the fold-bend portion 2*a*, and the pair of rotation preventing ribs 3*b* for holding to squeeze the fold-bend portion 2*a* of the roller shaft 2, the roller shaft 2 and the roller shaft drive gear 3 can be connected so as not to be rotated idly without providing a D cut or a pin inserting hole at the roller shaft 2. Thereby, the roller shaft 2 and the roller shaft drive gear 3 can be connected so as not to be rotated idly by only bending the roller shaft 2 in the L-like shape which can be worked in a short period of time without forming the D cut, the pin inserting hole or the like requiring a time period in working. As a result, the time period of working the roller 2 can be reduced and therefore, part cost can be reduced.

Further, according to the embodiment, by providing the hook portion 3*a* and the rotation preventing rib 3*b* integrally with the roller shaft drive gear 3 made of a resin, even when the hook portion 3*a* and the rotation preventing rib 3*g* are provided, a number of parts is not increased. Thereby, rotation of the roller shaft drive gear 3 can be transmitted to the roller shaft 2 without increasing the number of parts.

Further, according to the embodiment, by providing the through hole 6*a* rotatably fitted with the roller shaft drive gear 3 at the motor bracket 6 for attaching the motor 4, a member for attaching the roller shaft drive gear 3 needs not to be provided separately. Also thereby, a number of parts is not increased.

Further, according to the embodiment, by providing the drawout preventing portion 1*c* in the recess shape having the bottom portion to be fitted with the other end of the roller shaft 2 at the other side face 1*b* of the frame 1, the roller shaft 2 can be prevented from being drawn out in a horizontal direction.

Further, according to the embodiment, positional shift in the horizontal direction of the roller shaft drive gear 3 and the roller shaft 2 can be restrained when a position of the other end of the roller shaft 2 is restricted by the drawout preventing portion 1*c* in the state in which the stepped difference portion 3*d* of the roller shaft drive gear 3 is brought into contact with the side face of the motor bracket by forming the stepped difference portion 3*d* brought into contact with the side face of the motor bracket 6 at the roller shaft drive gear 3.

Further, according to the embodiment, when the roller shaft 2 and the roller shaft drive gear 3 are installed between the frame 1 and the motor bracket 6 arranged at a predetermined interval therebetween, the fold-bend portion 2*a* in the L-like shape of the roller shaft 2 can be fitted to the hook portion 3*a* and the rotation preventing ribs 3*b* of the roller shaft drive gear 3 from a vertical direction and therefore, in comparison with a case in which the roller shaft 2 is attached to the roller shaft drive gear 3 from the horizontal direction, attachment of the roller shaft 2 to the roller shaft drive gear 3 is facilitated. Thereby, the integrating steps can be simplified.

Next, an explanation will be given of operation of the thermally transcribing printer according to the embodiment in reference to FIG. 1 and FIG. 2. First, when the drive motor 4 is rotated in an arrow mark A direction (refer to FIG. 2), the middle gear 13 is rotated in an arrow mark B direction via the middle gears 11 and 12, and the middle gear 15 is rotated in an arrow mark C direction via the middle gear 14. At this occasion, the pivotable middle gears 17 and 18 are engaged with the middle gear 15 and therefore, the pivotable middle gear 17 is rotated in an arrow mark D direction and the pivotable middle gear 18 is rotated in an arrow mark E direction. Here, when the pivotable middle gear 17 is engaged with the roller shaft drive gear 3, the roller shaft drive gear 3 is rotated in an arrow mark F direction, and when the pivotable middle gear 18 is engaged with the middle gear 16, the roller shaft drive gear 3 is rotated in an arrow mark H direction. Further, when the middle gear 13 is rotated in the arrow mark B direction, the pivotable middle gear 19 is rotated in an arrow mark I direction since the pivotable middle gear-19 is engaged with the middle gear 13. At this occasion, when the pivotable middle gear 19 is engaged with the ink sheet winding gear 10, the ink sheet winding gear 10 is rotated in an arrow mark J direction.

Further, the embodiment disclosed this time is to be regarded as an exemplification and not to be restrictive in all the aspects. The range of the invention is shown not by the above-described explanation of the embodiment but by the scope of the claims, and includes all the modifications within the significance and the range equivalent to the scope of claims.

Further, although according to the above-described embodiment, the thermally transcribing printer is shown as an example of the image forming apparatus, the invention is not limited thereto but is applicable to other image forming apparatus of an ink jet printer, a laser printer or the like other than the thermally transcribing printer.

Further, although according to the above-described embodiment, there is shown an example for providing a pair (two) of the rotation preventing ribs at the roller shaft drive gear, the invention is not limited thereto but one or three or more of the rotation preventing ribs may be provided so far as a rotation preventing effect for holding the fold-bend portion of the roller shaft is achieved.

What is claimed is:

1. A thermally transcribing printer comprising:

a frame made of a metal in a channel-like shape having one side face and another side face;

a roller shaft made of a metal installed on an inner side of the frame and attached with a roller used for at least one of sheet charging and sheet discharging;

a roller shaft drive gear made of a resin attached to one end of the roller shaft for rotating the roller shaft;

a drive motor for driving to rotate the roller shaft drive gear; and a motor bracket made of a metal installed on an outer side of the one side face of the frame for attaching the motor, wherein:

the motor bracket includes a through hole rotatably fitted with the roller drive gear;

the frame includes a drawout preventing portion in a recess shape provided at the other side face of the frame and having a bottom portion fitted with another end of the roller shaft;

the roller shaft made of the metal includes one end having a fold-bend portion bent in an L-like shape and the other end fitted to the drawout preventing portion in the recess shape of the frame; and the roller shaft drive gear made of the resin is integrally formed with a hook portion engaged with a portion of the roller shaft other than the fold-bend portion disposed at a vicinity of the one end of the roller shaft and having an opening width smaller than a diameter of the roller shaft for restraining the roller shaft from being detached in the bended direction, a pair of rotation preventing ribs for squeezing the fold-bend portion of the roller shaft, an inserting portion rotatably inserted into the through hole of the motor bracket, and a stepped difference portion formed at a root portion of the inserting portion and brought into contact with a side face of the motor bracket.

2. An image forming apparatus comprising:

a roller shaft made of a metal attached with a roller used for at least either one of sheet charging and sheet discharging and including one end having a fold-bend portion bent in an L-like shape; and a roller shaft drive gear attached to the one end of the roller shaft having the fold-bend portion for rotating the roller shaft; wherein the roller shaft drive gear includes a hook portion engaged with a portion of the roller shaft other than the fold-bend portion disposed at a vicinity of the one end of the roller shaft for restraining the roller shaft from being detached in the bended direction, and a rotation preventing rib for holding the fold-bend portion of the roller shaft.

3. The image forming apparatus according to claim 2, wherein the roller shaft drive gear is made of a resin and the hook portion and the rotation preventing rib are integrally formed with portions of the roller shaft drive gear made of the resin.

4. The image forming apparatus according to claim 2, further comprising:

a drive motor for driving to rotate the roller shaft drive gear;

a motor bracket attached with the drive motor and including a through hole rotatably fitted with the roller shaft drive gear; and a frame including a drawout preventing portion in a recess shape having a bottom portion fitted with other end of the roller shaft.

5. The image forming apparatus according to claim 4, wherein the roller shaft drive gear is integraliy formed with an inserting portion rotatably inserted into the through hole of the motor bracket, and a stepped difference portion provided at a root portion of the inserting portion and brought into contact with a side face of the motor bracket.

* * * * *